United States Patent
Buracchini et al.

(10) Patent No.: US 8,559,964 B2
(45) Date of Patent: Oct. 15, 2013

(54) METHOD FOR CONFIGURING A TELECOMMUNICATIONS NETWORK, TELECOMMUNICATIONS NETWORK AND CORRESPONDING MANAGING ENTITIES

(75) Inventors: Enrico Buracchini, Turin (IT); Paolo Goria, Turin (IT); Alessandro Trogolo, Turin (IT)

(73) Assignee: Telecom Italia S.p.A., Milan (IT)

( * ) Notice: Subject to any disclaimer, the term of this patent is extended or adjusted under 35 U.S.C. 154(b) by 993 days.

(21) Appl. No.: 11/793,148

(22) PCT Filed: Dec. 14, 2004

(86) PCT No.: PCT/IB2004/004105
§ 371 (c)(1),
(2), (4) Date: Apr. 23, 2008

(87) PCT Pub. No.: WO2006/064302
PCT Pub. Date: Jun. 22, 2006

(65) Prior Publication Data
US 2008/0268861 A1    Oct. 30, 2008

(51) Int. Cl.
*H04W 72/00* (2009.01)
*H04W 40/12* (2009.01)

(52) U.S. Cl.
USPC ........ 455/452.1; 455/446; 455/448; 455/450; 455/454

(58) Field of Classification Search
USPC ................. 455/418, 450–455, 553.1, 446; 379/111–112.06
See application file for complete search history.

(56) References Cited

U.S. PATENT DOCUMENTS

| | | | |
|---|---|---|---|
| 5,592,480 A | 1/1997 | Carney et al. | |
| 6,011,785 A | 1/2000 | Carney et al. | |
| 6,023,622 A * | 2/2000 | Plaschke et al. | 455/452.2 |
| 6,185,418 B1 * | 2/2001 | MacLellan et al. | 455/418 |
| 6,496,490 B1 | 12/2002 | Andrews et al. | |
| 6,574,476 B1 | 6/2003 | Williams | |
| 7,116,980 B2 * | 10/2006 | Bigler et al. | 455/446 |
| 7,519,043 B2 * | 4/2009 | Porter et al. | 370/347 |
| 2010/0105347 A1 * | 4/2010 | Huang et al. | 455/226.4 |

FOREIGN PATENT DOCUMENTS

| | | |
|---|---|---|
| EP | 0 954 191 | 11/1999 |
| JP | 09-261723 | 10/1997 |
| JP | 2000-078651 | 3/2000 |
| JP | 2001-128237 | 5/2001 |
| WO | WO 97/41704 | 11/1997 |

OTHER PUBLICATIONS

Muratore, F. et al., "UMTS-Mobile Communications for the Future," 2 I Nuovi Requisit di Servizio Ed I Fattori di Innovazione, John Wiley & Sons Ltd., Chapter 2, pp. 12-39, (2001).

(Continued)

*Primary Examiner* — Matthew Sams
(74) *Attorney, Agent, or Firm* — Finnegan, Henderson, Farabow, Garrett & Dunner, L.L.P.

(57) ABSTRACT

In a telecommunications network that is able to manage cellular radio-mobile systems, base radio stations can be dynamically reconfigured through an exchange of messages from a configuration managing unit of radio resources adapted to be interfaced with many base radio stations and the affected base radio stations for dynamically reducing telecommunications network block conditions.

17 Claims, 9 Drawing Sheets

(56) References Cited

OTHER PUBLICATIONS

Mitola, J., "The Software Radio Architecture," IEEE Communications Magazine, pp. 26-38, (May 1995).

Buracchini, E., "The Software Radio Concept," IEEE Communications Magazine, pp. 138-143, (Sep. 2000).

An English translation of the Official Action issued by Japanese Patent Office on Mar. 3, 2010 in Japanese application No. 2007-546205.

* cited by examiner

METHOD FOR CONFIGURING A TELECOMMUNICATIONS NETWORK, TELECOMMUNICATIONS NETWORK AND CORRESPONDING MANAGING ENTITIES

CROSS REFERENCE TO RELATED APPLICATION

This application is a national phase application based on PCT/IB2004/004105, filed Dec. 14, 2004, the content of which is incorporated herein by reference.

FIELD OF THE INVENTION

The present invention deals with the dynamic configuration of telecommunications networks of the cellular radio-mobile type.

In particular, the invention deals with the dynamic configuration of base radio stations (generically designated with base station or BTS—Base Transceiver Station) of a telecommunications network of the cellular type.

As known, in the context of cellular networks, the exchange of communications in transmission and reception (transmitter-receiver) occurs through radio communications that use respective communication radio channels. In the context of the present description, the term "radio channel" is used for designating the physical resource that univocally identifies the radio connection between transmitter and receiver in the cellular network; the channel can be of a different type according to the access technique being taken into account and the type of system or network being taken into account.

In the case of an access technique of the FDMA (Frequency Division Multiple Access) type, the radio channel is identified through its frequency.

In the case of an access technique of the TDMA (Time Division Multiple Access) type, the radio channel is identified through a time slot.

In the case of an access technique of the CDMA (Code Division Multiple Access) type, the radio channel is identified through a code, for example of the orthogonal type.

It is also possible to combine many access techniques: in such case, the radio channel is identified by the characteristic elements of each combined access technique; for example in case of a GSM (Global System for Mobile communication) system, that, as known, uses a combined FDMA/TDMA access technique, the channel is identified through the frequency and time slot pair.

In the context of the present description, moreover, the term "system" or "radio system" is used to identify a plurality of elements in a communications network that are mutually coordinated according to a determined criteria or set of criteria (namely a "standard").

The terms "GSM system", "GPRS (General Packet Radio Service) system", "EDGE (Enhanced Data rates for Global Evolution) system", "UMTS (Universal Mobile Telecommunication System) system", "WLAN (Wireless Local Area Network) system" therefore are used to identify the plurality of elements in a communications network related to the corresponding standard.

Cellular radio-mobile networks generally comprise a radio access network and a fixed network (or core-network).

The radio access network in turn comprises a plurality of base radio stations, each one adapted to manage one or more cells, and a determined number of radio control nodes adapted to manage one or more base radio stations.

According to the systems, the base radio stations assume different denominations, being designated as BTS (Base Terminal station) in case of a GSM/GPRS/EDGE system or a 802.16 (WIMAX) system, such as NodeB (Node Base) in a UMTS system, Access Point in WLAN (802.11x) systems, while the corresponding radio control nodes or radio controllers are defined as BSC (Base Station Controller) in case of GSM/GPRS/EDGE, and RNC (Radio Network Controller) in the UMTS system.

The fixed network or core-network comprises core network nodes that have various names, for example MSC (Mobile Switching Centre), SGSN (Serving GPRS Support Node) and GGSN (Gateway GPRS Support Node).

In general, the elements composing the radio access network are specific to the cellular system they belong to (for example BTS and BSC in case of GSM/GPRS/EDGE, NodeB and RNC in case of UMTS) and are not interchangeable among the different systems.

The core-network elements, instead, can be used for governing and managing many standards or types of systems.

From the hardware point of view, every base radio station (base station) is able to manage a maximum number of radio resources related to the system for which it has been designed, depending on the complexity and amount of hardware with which it has been assembled or equipped.

In particular, in every base station, the receiving-transmitting capacity can be changed, by increasing or decreasing the number of hardware resources (e.g. transceiver), statically and a posteriori, on the basis of network traffic measurements and consequent cellular re-planning.

The development of different systems that temporally and geographically coexist (on a shared area) poses the technical problem of simultaneously managing in the same area two or more systems to suit the network to users' characteristics and optimise the use of resources. Typically, such kind of problem occurs for a radio-mobile operator or manager that already has an installed network and wants to add a network related to a new-generation system (for example an operator with a GSM/GPRS/EDGE network that wants to add a UMTS network). In addition to the problem of installing new hardware components and make them coexist with the existing ones, the manager must/wants to be able to dynamically manage the hardware resources dedicated to the already present system and to the new-generation systems, namely depending on the variation of traffic insisting on area cells.

PRIOR ART

In the prior art, it has been proposed that the operators that installed in the past a second-generation cellular network (e.g. GSM/GPRS/EDGE or IS-95—Interim Standard 95), in order to be able to deploy third-generation networks (e.g. UMTS or CDMA 2000—Code Division Multiple Access 2000), install completely new hardware elements, particularly as regards base radio stations (NodeB) and radio control nodes or radio controllers (RNC).

See, for example, "Flavio Muratore et al., UMTS—Mobile Communications for the Future", John Wiley & Sons Ltd., 2001, in particular chapter 2, dedicated to UMTS, that suggests sharing the part of fixed network and installing a completely new access network uncoupled from the already present access network; in this case, balancing between access networks can only occur by means of physical hardware modification interventions (addition or removal of available resources).

An arrangement of this type is costly and does not allow a dynamic resources management. Actually, although secondand third-generation base radio stations are often mutually co-located, radio access networks nodes of the different systems are completely uncoupled and independent one from the other.

Systems are also known with re-configurable elements (apparatus and/or devices) of the access network (terminals, base stations, network nodes . . . ) (Joe Mitola, "The Software Radio Architecture", IEEE Communications Magazine, May 1995, E. Buracchini "The Software Radio Concept", IEEE Communications Magazine, September 2000).

These re-configurable systems comprise apparatus and/or devices in which the operating functioning can be reconfigured at will: for example, a re-configurable radio terminal that receives a second-generation system (e.g. GSM/GPRS/EDGE), can be reconfigured in such a way as to operate with a third-generation system (e.g. UMTS or CDMA 2000) or a WLAN system or the DVB-T (Digital Video Broadcasting Terrestrial) etc.

According to the prior art, in order to be able to perform configuration or reconfiguration, it is necessary that the apparatus operating functions are realised with a technology that is in turn able to be configured or reconfigured; therefore, re-configurable devices have a re-programmable hardware consisting of a set of FPGA (Field Programmable Gate Array), DSP (Digital Signal Processor) and microprocessors and the individual device functionalities, even of a lower protocol level, are realised, for example, through software. Consequently, in order to reconfigure an apparatus realised in this way it is enough, generally, to replace the operating software that manages the device hardware.

Documents U.S. Pat. No. 5,592,480 and U.S. Pat. No. 6,011,785 describe the realisation of a base station of the access network with re-configurable hardware, that is able to support a plurality of mobile radio system and share processing resources among them.

These documents disclose the architecture of a re-configurable base station that is able to support many cellular systems and to reconfigure hardware resources depending on the type of traffic insisting on the cells covered by the base station.

In particular, such documents describe a re-configurable base station realised with re-configurable hardware of the DSP type that allow using several standardised radio interfaces by dynamically re-distributing the resources inside the cells.

Therefore, in the mentioned prior art, the hardware resources reconfiguration occurs autonomously by the base station itself that is able to configure or re-configure itself depending on traffic associated with cells covered by the same base station.

Taking into account a wide set of cells in a determined managed area (e.g. a town or its centre), it is possible that traffic, of a same system or of different systems, changes from one area to the other when the hours of the day change.

It can further happen that there are congested cells, namely cells characterised by high percentages of calls/connections block, in some areas (called hot spots) in which traffic is heavier, while nearby cells are scarcely loaded or characterised by low block percentages.

The Applicant has discovered that a major technical problem not solved by the prior art is being able to dynamically reducing the blockage of a cell or a set of cells managed by a base station and including one or more systems, without recurring, for example, to the addition of further base stations.

The Applicant has further discovered that the prior art is not able to solve, for example, congestion problems that can occur in a determined geographical area, such as a town, in case of localised extraordinary events, such as a football game or a concert in a stadium; in fact, under such situations, there is the chance that the base station and its corresponding cells that cover the stadium are congested when the event occurs and are completely unloaded when there are no events and that it is impossible, in case of congestion, to solve such problem, unless recurring, for example, to mobile means that are suitably equipped with additional base stations.

The Applicant therefore states that it would be desirable for a mobile operator to have available, in a determined geographical area, a re-configurable network, that is efficiently managed and is able to dynamically adapt itself to traffic variations relating to one or more systems being present in the area.

DESCRIPTION OF THE INVENTION

Object of the present invention is satisfying the above needs.

According to the present invention, this object is obtained due to a method having the characteristics disclosed in the following claims. The present invention also deals with a communications network that is configured for implementing the method, a managing entity configured for implementing the method, in addition to a computer program product or a set of computer program products that can be loaded in the memory of at least one computer and comprising portions of software code for performing the above method, when the product is run on at least one computer. As used here, the reference to such computer program product is meant as equivalent to a computer readable medium containing instructions for controlling a computer system in order to coordinate the performance of the process according to the invention. The reference to "at least one computer" is intended to highlight the possibility that the present invention is implemented in a distributed and/or modular way. The claims are an integral part of the technical teaching that is provided here regarding the invention.

A preferred embodiment provides for a re-configurable network architecture that is able to suit itself to traffic variations of one or more systems that can be found in the managed area and, in particular, that is able to dynamically reduce network block situations that can be attributed to a congestion of at least one base station cell.

In a particularly preferred way, the reconfiguration is performed by radio control nodes of the access network taking into account the needs of adjacent cells, possibly associated with different base stations. Due to such fact, namely that the reconfiguration is performed by radio control nodes, the reconfiguration can also take into account possible radio resources (channels) assignment policies performed by radio control nodes themselves.

The reconfiguration provides a joint management of all resources available to each cell, independently from the standard or system being taken into account.

The invention allows obtaining an improvement of global network performance, such as for example a reduced percentage of blocked calls, since the radio control nodes manage the radio resources reconfiguration of different access network cells.

Due to the invention, an operator that wants, for example, to operate with many systems, can physically install one access network only, whose base radio stations are able to manage different relevant standards, and can dynamically control the percentage of resources of each cell dedicated to a system or another one.

The dynamic radio resources reconfiguration makes the use of radio resources particularly efficient, taking the operator network to an optimum situation in terms of radio interference and simultaneously reducing necessary investments for radio resources, that as known are particularly precious.

A further preferred embodiment of the present invention provides that the reconfiguration is realised taking into account the traffic need for all cells of the managed area and the availability in terms of radio channels in the managed area.

According to such further embodiment, the reconfiguration provides for dynamically reallocating the available radio channels in the area depending on traffic needs.

Due to such further aspect, after having fixed, for example, a determined planning in terms of frequencies assigned to the various cells, the radio channels available for every cell can be increased or decreased, depending on the sudden and dynamic traffic change.

BRIEF DESCRIPTION OF THE FIGURES

The invention will be described in more detail herein below, with reference to an embodiment provided only as an example and without limitations, shown in the following figures wherein.

DETAILED DESCRIPTION

Figure 1:
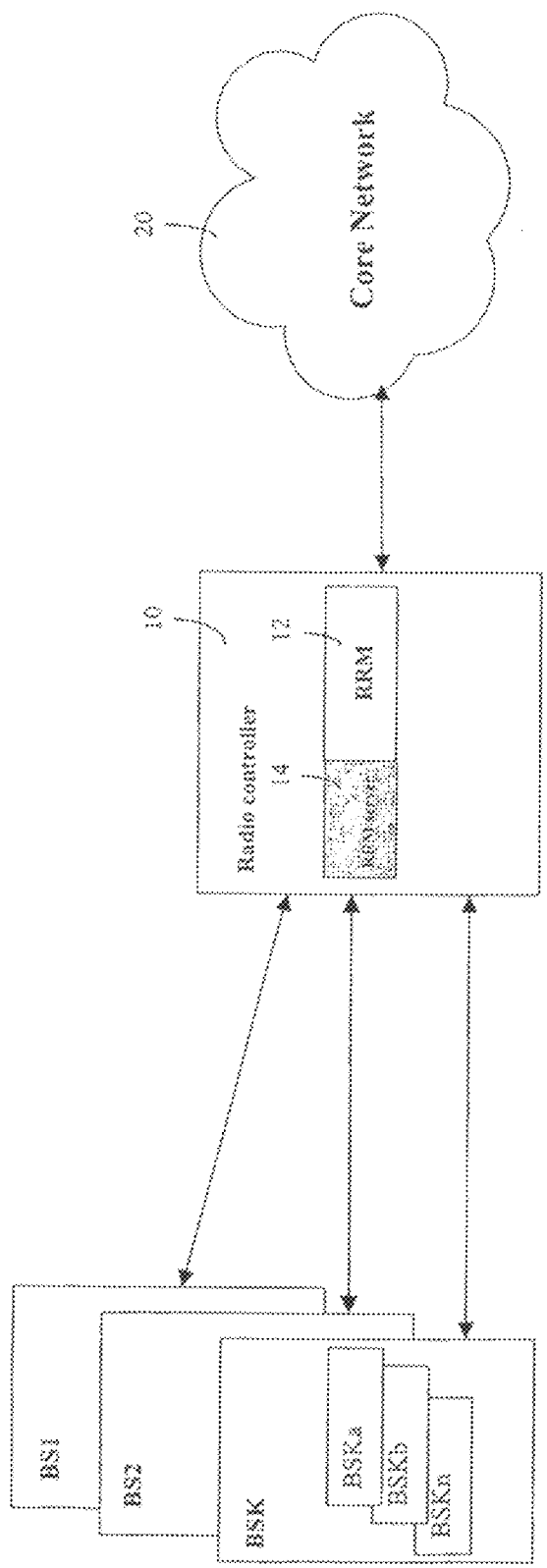
FIG. 1 schematically shows the architecture of a network according to a preferred embodiment of the invention.

With reference to the drawings, the principle architecture of a preferred embodiment of the invention is shown in FIG. 1, in which there are a control node or radio controller 10 of the radio access network of a cellular system (for example BSC node in case of a GSM/GPRS/EDGE system and RNC node in case of a UMTS system), one or more base stations BS1, BS2, BSk and a core network 20, all representing nodes of a generic network in a cellular system.

Each base station (BS1, . . . BSk) is connected to the radio controller 10 that in turn is connected to the core-network 20, with known connections.

According to a first embodiment, the base stations BS1, . . . . BSk (BTS stations in case of GSM/GPRS/EDGE and NodeB in case of UMTS) are of the re-configurable type and are therefore able to manage many systems.

Each base station (BS1, . . . BSk) comprises hardware and/or software receiving-transmitting (base station transceivers or transceivers) modules designated as BSKa, BSKb, BSKn, of a re-configurable type and is configured for managing transceivers BSKa, BSKb, BSKn depending on protocol messages coming from the radio controller 10, as will be described in detail below.

The set of transceivers (BSKa, BSKb, BSKn), according to a preferred embodiment, is adapted to manage one or more radio channels (radio resources) of one or more cells managed by each base station (BS1, . . . , BSk).

The radio controller 10, in turn, is configured according to the present embodiment, for managing the radio resources of the different systems that are used in the radio-mobile network by the base stations (BS1, . . . BSk), for example BTS stations in case of GSM/GPRS/EDGE and NodeB in case of UMTS.

In a first embodiment, the radio controller 10 comprises an entity that is generally designated as RRM (Radio Resource Management) 12, of a known type, whose purpose is managing request and assignment of radio channels of mobile terminals that can be found in cells managed by the base stations (BS1, . . . BSk) connected to the radio controller 10 and, according to a preferred embodiment, a configuration managing entity for radio resources (Configuration Manager) 14 associated to the RRM entity 12 and adapted to cooperate with the RRM entity 12 to allow managing the radio resources of different systems.

In a second embodiment provided for the present invention, the configuration managing entity for the radio resources (Configuration Manager) 14 is inserted in a network portion that is different from the radio controller, for example in the core network. This embodiment is particularly suitable for managing networks that comprise radio resources adapted to operate according to standards that do not provide the radio controller function, such as, for example, WLAN, 802.16 (WIMAX) or 802.20, DVB-T, DVB-S, DVB-H systems. Moreover, the Configuration Manager entity can be included in a core network node, for example in the MSC (Mobile Switching Centre), of a network that provides for the presence of the radio controller. In this case, the Configuration Manager entity can advantageously be configured for cooperating with one or more radio controllers for checking and reconfiguring the plurality of cells controlled by the one or more radio controllers.

In each of the two mentioned embodiments, the radio resources configuration managing entity (Configuration Manager) 14 is associated with a set of at least two network base radio stations. The Configuration Manager entity 14 is adapted to monitor and configure the radio resources of the cells connected to the base radio stations associated with the managing unit itself. Preferably, the Configuration Manager entity is equipped with one or more program modules adapted to implement the following functionalities or macro-steps:

monitoring and measuring the load status of cells associated with the managing unit, for example the requests coming from different systems;

checking conditions of cells associated with the managing unit and, depending on the check, dynamically configuring (or reconfiguring) the cells managed by the base radio stations so that the hardware resources are shared among the various systems proportionally to the traffic volume required for the cells.

The following description will refer to the first embodiment, in which the Configuration Manager is part of the radio controller. What is described could be applied, with the suitable variations that will be clear to the skilled in the art in view of the present description, also to the second embodiment.

Due to the described architecture, the radio controller 10 is able to measure, by means of the Configuration Manager 14, the load status of cells managed by the various base stations (BS1, . . . BSk) and to dynamically reconfigure, after the measures, the cells of the various base stations (BS1, . . . BSk) operating on the transceivers (BSKa, BSKb, BSKn) by means of reconfiguring commands managed by the Configuration Manager 14, as will be described in detail below.

The described architecture allows, for example, optimising the management of radio resources assigned to various systems depending on the load being present in the cells.

Figure 2:
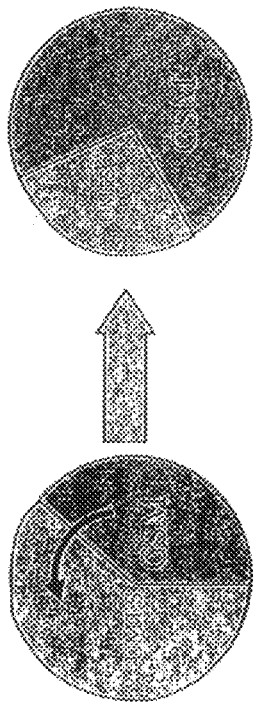
FIG. 2 shows an example of resources allocation between GSM system and UMTS system.

For example, with reference to FIG. 2, taking into account the two GSM/GPRS/EDGE and UMTS systems, in a set of cells with much traffic of the GSM/GPRS/EDGE type and little traffic of the UMTS type, the Configuration Manager 14, in the described configuration, will take care of reconfiguring the cell radio resources by operating on the transceivers (BSKa, BSKb, BSKN) so that the majority of the processing capability is reserved to the GSM/GPRS/EDGE system.

Similarly, if in the set of cells, there is little traffic of the GSM type and much of the UMTS type, the Configuration Manager 14 will take care of reconfiguring the cell radio resources by operating on the transceivers (BSKa, BSKb, BSKn) so that the majority of the processing capacity is reserved to the UMTS system.

Function of the Configuration Manager 14 entity included in the radio controller 10 is therefore monitoring and measuring the activity status of the cells related to the relevant base radio stations and, depending on the activity status of the cells related to the relevant base radio stations, if necessary, it can reconfigure the base radio stations modules through suitable reconfiguration messages to the transceivers (BSKa, BSKb, BSKn), as will be described in detail below.

The Configuration Manager 14 allows monitoring and measuring the cell status related to relevant base radio stations, and comprises software and/or hardware modules configured for monitoring and/or storing, for example in an internal Configuration Manager 14 memory, for every cell, a set of data related to activities dealing with the different systems managed in the network.

In the present embodiment, the cell status is meant as including:
- amount of traffic for every system insisting on each cell;
- amount of available and not available radio resources for every cell by system.

In particular, the Configuration Manager 14, in the preferred embodiment, is configured for performing the macro-steps cyclically, starting, for example, from an initial condition set by the operator that manages the network, depending on planning parameters:
- the first macro-step of time length T, whose duration T is defined, for example, by the operator, in which the Configuration Manager 14 unit of the radio controller 10 measures and/or stores as data the number of GSM and UMTS activities for each controlled cell, as will be better stated below;
- the second macro-step, in which the Configuration Manager 14 unit, depending on the number of measured activities, checks for every cell whether it is necessary to perform a resources reconfiguration of the transceivers (BSKa, BSKb, BSKn) in the respective base stations (BS1, . . . BSk) and performs the reconfiguration if there is such need.

The dynamic radio resources reconfiguration of base radio stations (BS1, . . . BSk) cells is performed, in the second macro-step, by exchanging, between radio controller 10 and base radio stations (BS1, . . . BSk), a set of protocol messages adapted to allow reconfiguring the cells of the various base radio stations (BS1, . . . BSk).

In particular, the messages, according to a preferred embodiment, are generated by the Configuration Manager 14 and exchanged with the transceivers (BSKa, BSKb, BSKn) by means of the base radio stations (BS1, . . . BSk).

An example of protocol messages, adapted to allow reconfiguring the base radio stations (BS1, . . . BSk), is given in the following.

Figure 10:
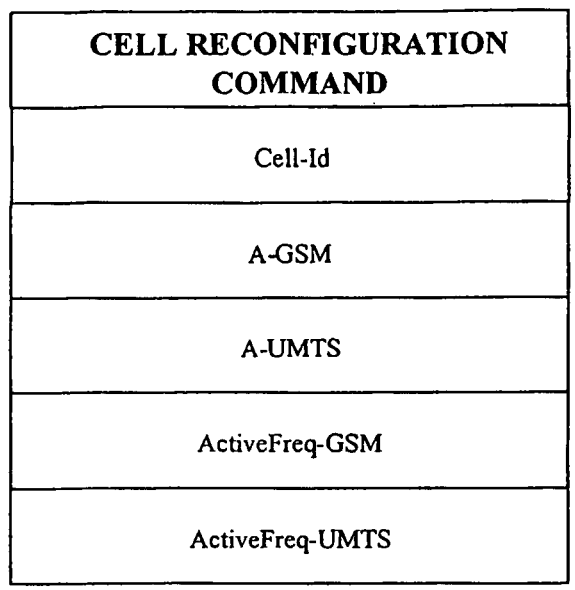
FIG. 10-12 show the structure of protocol messages related to a preferred embodiment of the invention.
Figure 11:
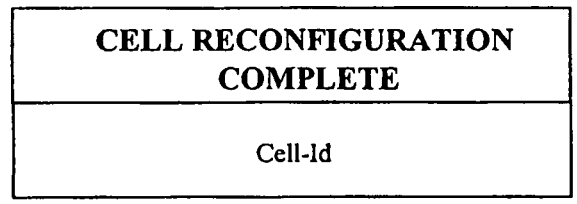
Figure 12:
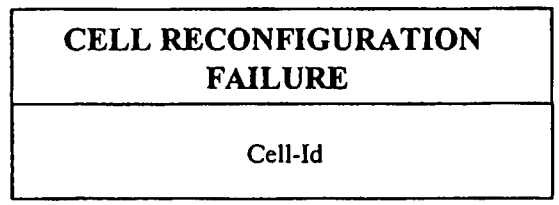

The messages, as can clearly appear to a skilled person in the art, can be exchanged between to radio controller 10 and base radio stations (BS1, . . . BSk) making use of existing connections between radio controller 10 and base radio stations (BS1, . . . BSk), or of specific connections. In the present, non-limiting embodiment, the messages exchanged through a specific connection are described, that, according to a preferred embodiment, comprise, for example:

A message of the CELL RECONFIGURATION COMMAND type adapted to control the cell reconfiguration and comprising, for example, at least one of the following fields, as shown in FIG. 10; the message is transmitted by the Configuration Manager 14 to one or more base stations (BS1, . . . BSk):
- Cell identifier: Cell-Id
- Number of GSM resources to be configured: A-GSM
- Number of UMTS resources to be configured: A-UMTS
- List of GSM carriers to be activated in the cell: ActiveFreq-GSM
- List of UMTS carriers to be activated in the cell: ActiveFreq-UMTS A message of the CELL RECONFIGURATION COMPLETE type adapted to notify the cell reconfiguration completion and comprising, for example, at least one set of the following fields, as shown in FIG. 11; the message is transmitted by one or more base stations (BS1, . . . BSk) to the Configuration Manager 14:
- Cell identifier: Cell-Id:

A message of the CELL RECONFIGURATION FAILURE type adapted to notify the cell reconfiguration failure and comprising, for example, at least one set of the following fields, as shown in FIG. 12; the message is transmitted by one or more base stations (BS1, . . . BSk) to the Configuration Manager 14:
- Cell identifier: Cell-Id.

The number and contents of the various messages, as a person skilled in the art can comprise, can be different from the one in the example, provided that such messages allow starting, completing or aborting the reconfiguration step.

Data related to the cell status are included herein below according to what is provided in the preferred embodiment.

In particular, an example of data used in case of GSM/GPRS/EDGE and UMTS systems is shown below.

Herein below, data pointed out with GSM superscript or subscript are related to the GSM/GPRS/EDGE system, while data pointed out with UMTS superscript or subscript are related to the UMTS system.

Moreover, the example identifies as radio resources only the frequencies used in the systems being taken into account.

Data comprise, for example:

$PlannedFreq_{GSM}$: list of all GSM frequencies planned for use inside each cell.

$ActiveFreq_{GSM}$: list of currently active GSM frequencies inside each cell.

$AvailableFreq_{GSM}$: list of currently unused GSM frequencies in cells adjacent to each cell: this list comprises only the frequencies that are currently not used inside the current cell and the adjacent cells; the list can be obtained through the following expression in which i=0 means the current cell; $1 \leq i \leq k$ means the k adjacent cells:

$$AvailableFreq_{GSM} = \cap_{i=0}^{k}(cells | \in PlannedFreq_{GSM}^{i}, \notin ActiveFreq_{GSM}^{i})$$

AddCarrier$_{GSM}$: new GSM frequency being assigned to one or more cells.

DropCarrier$_{GSM}$: GSM frequency being deactivated from one or more cells.

PlannedFreq$_{UMTS}$: list of all UMTS frequencies planned for use inside each cell.

ActiveFreq$_{UMTS}$: list of currently active UMTS frequencies inside each cell.

AvailableFreq$_{UMTS}$: list of currently unused UMTS frequencies in adjacent cells to each cell: this list comprises only those frequencies that are currently not used inside the current cell and the adjacent cells; the list can be obtained through the following expression in which i=0 means the current cell; 1≤i≤k means the k adjacent cells:

$$\text{AvailableFreq}_{UMTS} = \cap_{i=0}^{k}(\text{cells} | \in \text{PlannedFreq}_{UMTS}^{i}, \notin \text{Active Freq}_{UMTS}^{i})$$

AddCarrier$_{UMTS}$: new UMTS frequency being assigned to one or more cells.

DropCarrier$_{UMTS}$: UMTS frequency being deactivated from one or more cells.

N$_{GSM}$: number of radio channels of the GSM type currently assigned, but not necessarily used, in each cell. In other words, it is the maximum number of transceivers of the GSM type that can be activated in each cell according to the current hardware configuration.

N$_{UMTS}$: number of radio channels of the UMTS type currently assigned, but not necessarily used, in each cell. In other words, it is the maximum number of transceivers of the UMTS type that can be activated in each cell according to the current hardware configuration.

N$_{tot}$: total number of radio channels of the GSM and UMTS type currently assigned, but not necessarily used, in each cell. In the present example, it is the sum of N$_{GSM}$ and N$_{UMTS}$.

A$_{GSM}$: number of radio channels of the GSM type after the current configuration; the following relationship: A$_{GSM}$=N$_{GSM}$±Δ, is valid, where Δ is equal to the number of radio channels that are currently being assigned/deactivated.

A$_{UMTS}$: number of radio channels of the UMTS type after the current configuration; the following relationship: A$_{UMTS}$=N$_{UMTS}$±Δ is valid, where Δ is equal to the number of radio channels that are currently being assigned/deactivated.

RES$_{tot}$: maximum number of available radio channels for each cell for all managed systems: it depends on the complexity of the re-configurable hardware used for realising the base station; depending on the above-defined N$_{GSM}$, N$_{UMTS}$, A$_{GSM}$ and A$_{UMTS}$ parameters, the following relationships are valid:

$$N_{GSM} + N_{UMTS} = N_{tot} \leq RES_{tot}$$

$$A_{GSM} + A_{UMTS} = N_{tot} \leq RES_{tot}$$

k$_{GSM}$: memory constant, weight with which the time averages of the number of GSM radio channels GSM to be assigned in the cell are performed (0≤k$_{GSM}$≤1).

k$_{UMTS}$: memory constant, weight with which the time averages of the number of GSM radio channels UMTS to be assigned in the cell are performed (0≤k$_{UMTS}$≤1).

α$_{THRESHOLD}$: threshold, defined for example by the operator, under which the a value, quantity used in the below-described procedure, is deemed null.

β$_{THRESHOLD}$: threshold, defined for example by the operator, under which the β, quantity used in the below-described procedure, is deemed null.

T: monitoring period of the number of GSM and UMTS activities for each cell controlled by the radio controller 10.

R$_{GSM}$: number of GSM terminals for each cell that have had an activity (for example, transmission of Short Message Services (SMS)/Multimedia Message Services (MMS), received call, performed call) during the last monitoring period.

oldR$_{GSM}$: number of GSM terminals for each cell that have had an activity (for example, transmission of SMS/MMS, received call, performed call) during the last-but-one monitoring period.

BlockThreshold$_{GSM}$: threshold of the percentage value of blocked GSM calls for each cell above which new radio channels can be added to the cell.

REQ$_{GSM}$: number of requests from GSM terminals for each cell in order to obtain a system access for some reason (for example, transmission of SMS/MMS, received call, performed call) during the last monitoring period.

REJ$_{GSM}$: number of blocked requests from GSM terminals for each cell due to lack of resources during the last monitoring period.

R$_{UMTS}$: number of UMTS terminals for each cell that have had an activity (for example, transmission of SMS/MMS, received call, performed call) during the last monitoring period.

oldR$_{UMTS}$: number of UMTS terminals for each cell that have had an activity (for example, transmission of SMS/MMS, received call, performed call) during the last-but-one monitoring period.

BlockThreshold$_{UMTS}$: threshold of the percentage value of blocked UMTS calls for each cell above which new radio channels can be added to the cell.

REQ$_{UMTS}$: number of requests from UMTS terminals for each cell in order to obtain a system access for some reason (for example, transmission of SMS/MMS, received call, performed call) during the last monitoring period.

REJ$_{UMTS}$: number of blocked requests coming from UMTS terminals for each cell due to lack of resources during the last monitoring period.

List$_{GSM}$: list of IMSI (or TMSI or TLLI) identifiers of GSM terminals that have had activities (for example, transmission of SMS/MMS, received call, performed call) for each cell. Every list element contains at least one set of the following fields: IMSI, TMSI, TLLI.

List$_{UMTS}$: list of IMSI (or TMSI or TLLI) identifiers of UMTS terminals that have had activities (for example, transmission of SMS/MMS, received call, performed call) for each cell. Every list element contains at least one set of the following fields: IMSI, TMSI, TLLI.

Every base station (BS1, . . . BSk) keeps track of the present situation in each cell, for example, with the following data:

Calls$_{GSM}$: number of currently pending GSM calls.

Calls$_{UMTS}$: number of currently pending UMTS calls.

The number and contents of above-listed data are related to the described embodiment; it is clear that the number and contents of such data could be different in other embodiments that anyway aim to the dynamic reconfiguration of re-configurable cells.

A preferred embodiment of the method according to the invention will now be described.

The method description, for completeness, details the elementary steps of a possible embodiment without precluding that the method according to the invention can be implemented with different elementary steps without however modifying the technical effect that can be reached.

Initial Cell Status

The initial condition, namely the condition in which the procedure of the invention operates for the first time, is, for example, represented through the following data:

the frequencies being present in PlannedFreq$_{UMTS}$ and PlannedFreq$_{GSM}$ related to the frequency planning performed, for example, by the operator for every cell, a single frequency in ActiveFreq$_{GSM}$ and ActiveFreq$_{UMTS}$ lists, for example the first one being present in PlannedFreq$_{GSM}$ and PlannedFreq$_{UMTS}$ lists.

for every cell, in the AvailableFreq$_{GSM}$ list, all non-active frequencies being present in its own PlannedFreq$_{GSM}$ list and the non-active frequencies being present in similar PlannedFreq$_{GSM}$ lists of adjacent cells;

for every cell, in the AvailableFreq$_{UMTS}$ list, all non-active frequencies being present in its own PlannedFreq$_{UMTS}$ list, and the non-active frequencies being present in similar PlannedFreq$_{UMTS}$ lists of adjacent cells;

for every cell, number N$_{tot}$;

all other data to which a parameter cannot be given by the operator, with initial null value.

Taking into account, for example, a network in which two systems, GSM system and UMTS system, live together.

First Macro-Step

Figure 3:
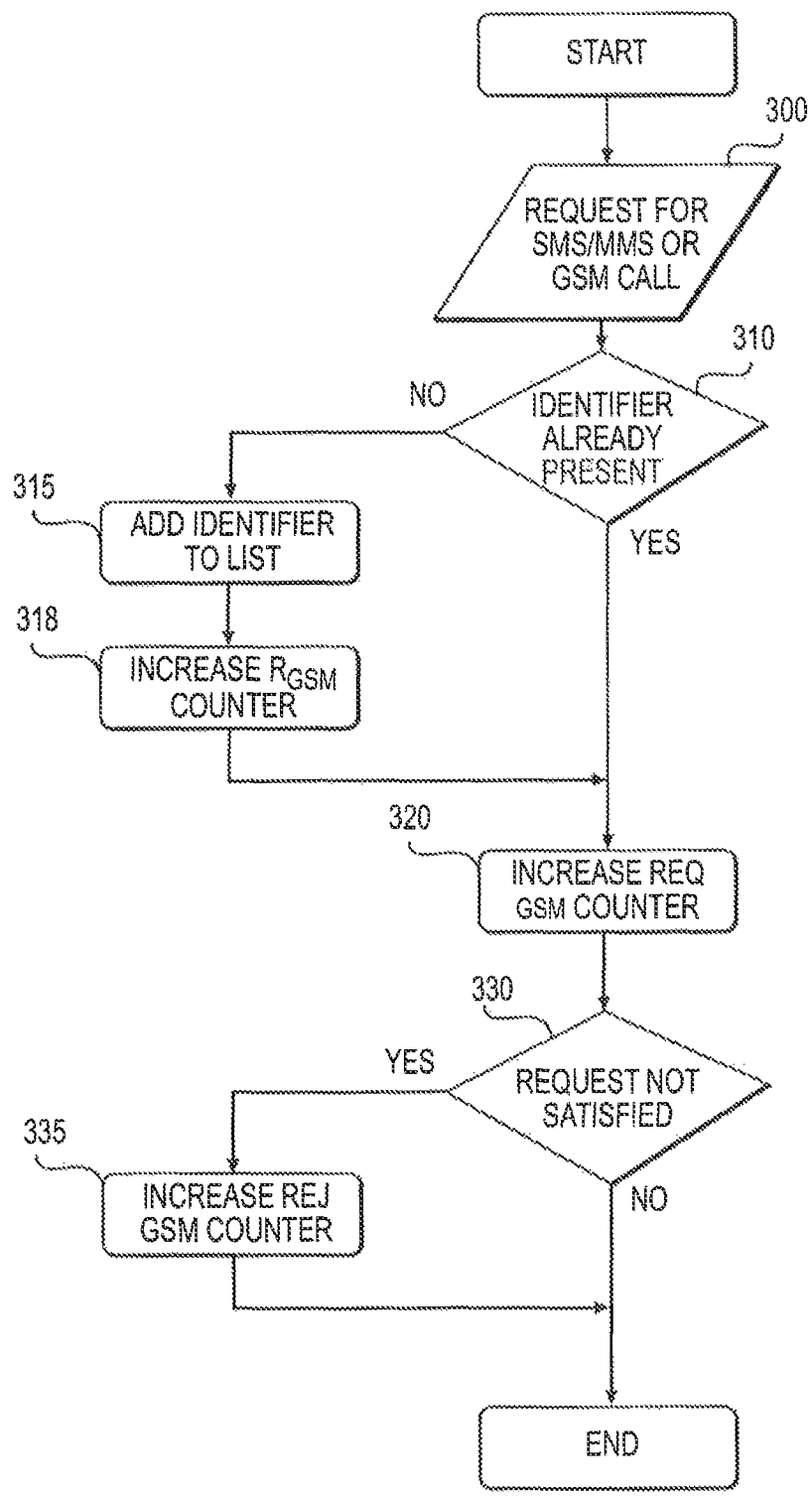
FIGS. 3 and 4 are flow diagrams that show the monitoring procedure for the cell activity status.

In the first macro-step, for example, the Configuration Manager 14, in case a request for transmitting/receiving SMS/MMS or starting a call/connecting (ended call or originated call) of the GSM type is detected, performs, for each cell managed by the radio controller 10, the following steps (FIG. 3, step 300):

verifying whether in the List$_{GSM}$ list the identifier is already present for the terminal (TMSI or IMSI or TLLI) that has performed the request (step 310);

if it is not present (step 310-NO):
  i. adding the identifier of the terminal (TMSI or IMSI or TLLI) that has performed the request to the List$_{GSM}$ list (step 315);
  ii. increasing the R$_{GSM}$ counter (step 318) and proceeding with step 320;

if the identifier is present (step 310-YES):
increasing the REQ$_{GSM}$ counter (step 320);

if the request is not satisfied (namely it is blocked) (step 330-YES):
  i. increasing the REJ$_{GSM}$ counter (step 335) and ending the procedure;

alternatively (step 330-NO) ending the procedure.

Figure 4:
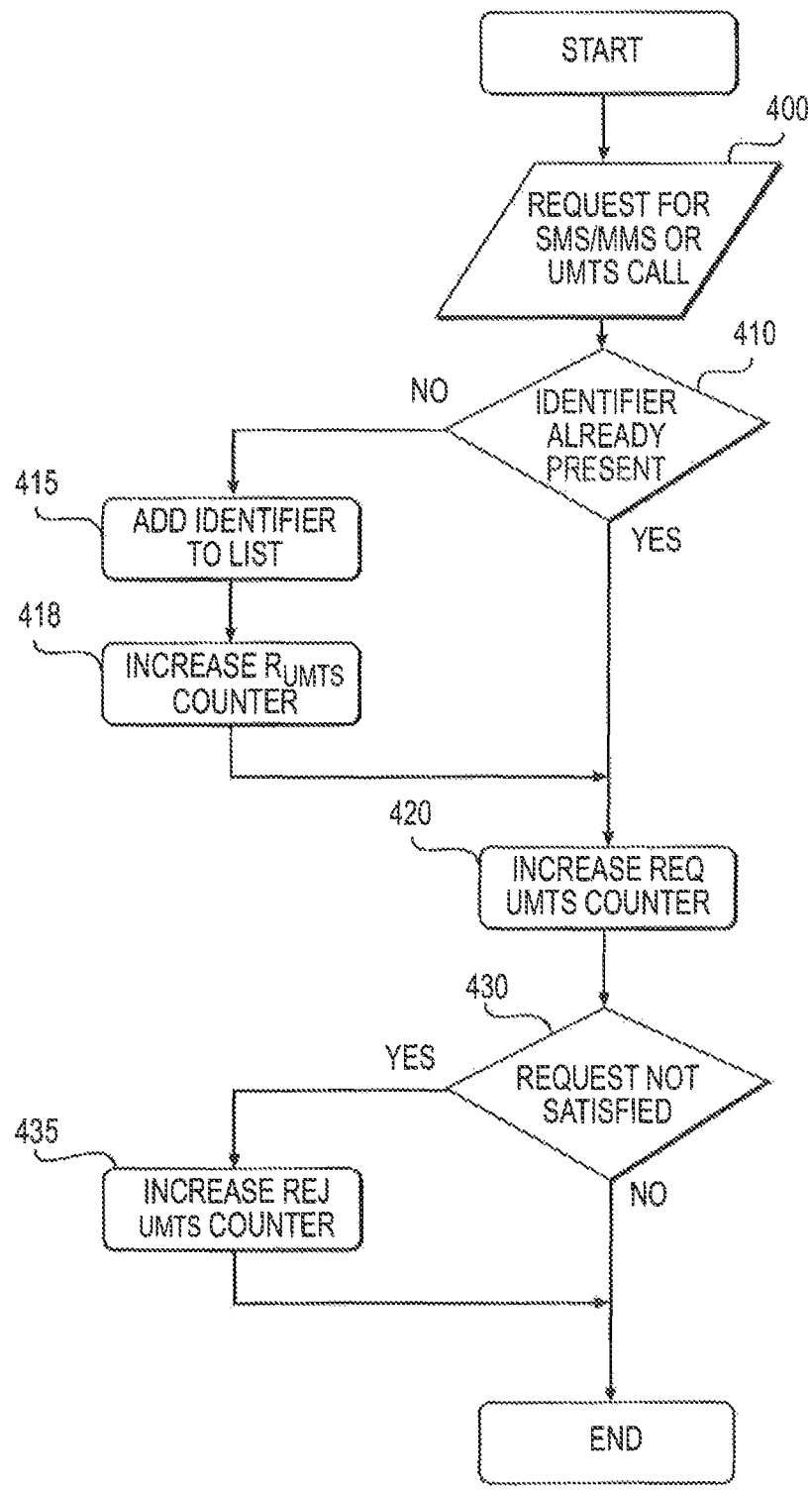

Similarly, for every request for transmitting/receiving SMS, MMS or starting a call/connection (ended or originated) of the UMTS type, the Configuration Manager 14 performs, for each cell managed by the radio controller 10, the following steps (FIG. 4, step 400):

verifying whether in the List$_{UMTS}$ list there is already the identifier for the terminal (IMSI or TMSI or U-RNTI) that has performed the request (step 410);

if it is not present (step 410-NO):
  i. adding the identifier of the terminal (IMSI or TMSI or U-RNTI) that has performed the request to the List$_{UMTS}$ list (step 415);
  ii. increasing the R$_{UMTS}$ counter (step 418) and proceeding with step 420;

if the identifier is already present (step 410-YES)
increasing the REQ$_{UMTS}$ counter (step 420);

if the request is not satisfied (is blocked) (step 430-YES):
  i. increasing the REJ$_{UMTS}$ counter (step 435) and ending the procedure alternatively (step 430-NO) ending the procedure.

Second Macro-Step
Block Index Measure

Figure 5:
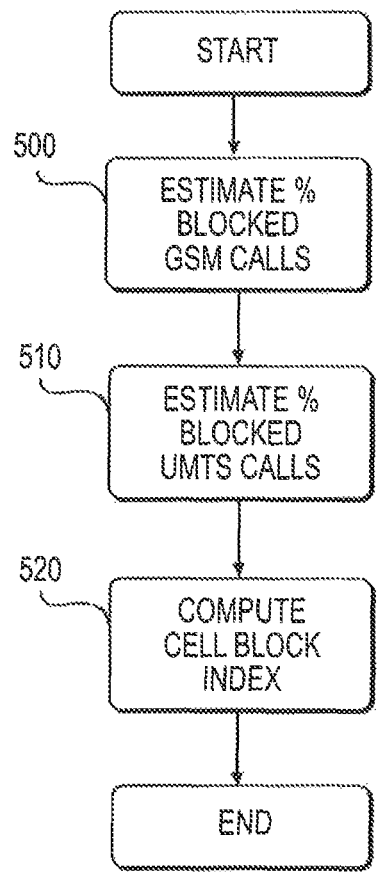
FIG. 5 shows a first step of the reconfiguration procedure according to the invention.

The second macro-step starts with measuring the block probabilities for every cell managed by the radio controller and, for example, with their storing; the block probability measurement is performed, for example, through the following steps (FIG. 5):

1. estimating the percentage of blocked GSM calls in time interval T (step 500) with:

$$Blocked_{GSM} = \frac{REJ_{GSM}}{REQ_{GSM}}$$

2. estimating the percentage of blocked UMTS calls in time interval T (step 510) with:

$$Blocked_{UMTS} = \frac{REJ_{UMTS}}{REQ_{UMTS}}$$

3. computing the cell block index (step 520) as follows:

$$I_{BLOCKED} = Blocked_{GSM} + Blocked_{UMTS}$$

The block percentage estimations are obtained, in the present embodiment, by performing the ratio between number of unsatisfied requests and total number of requests.

Obviously such percentages, or possible associated block probabilities, could be determined in other ways without modifying their meaning.

The block index is computed, for example, as the sum of such percentages and its absolute value is in the example proportional to the possible cell block status.

Also for such index, other computation modes can be used without modifying its meaning.

Afterwards, the Configuration Manager 14 uses the block index to perform, for example, the ordering, in a decreasing order, of all cells depending on the I$_{BLOCKED}$ block index so that the ordering have cells with higher block index in a priority position.

Cell Status Check

Figure 6:
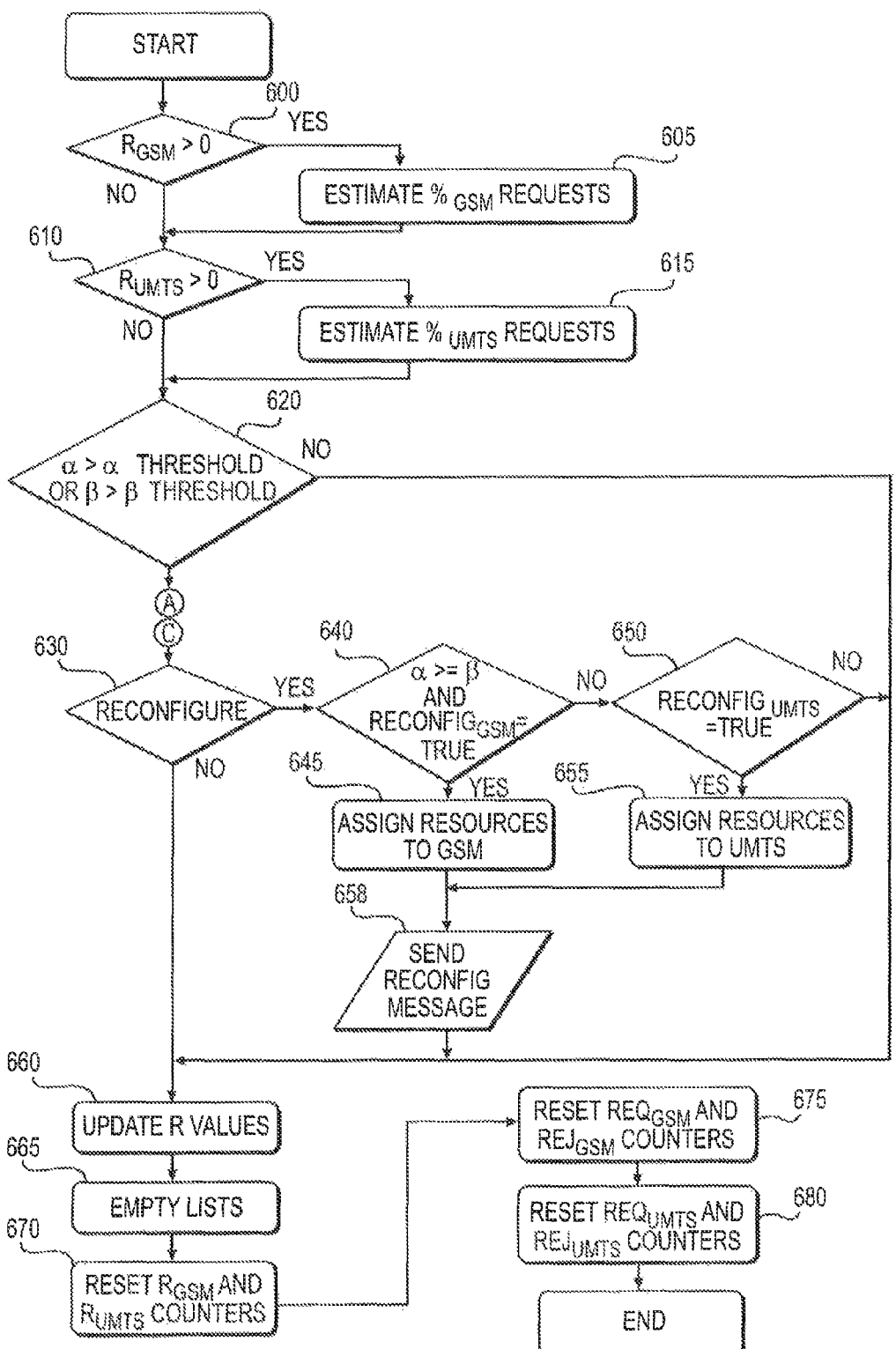
FIG. 6-8 show a second step of the reconfiguration procedure according to the invention.
Figure 7:
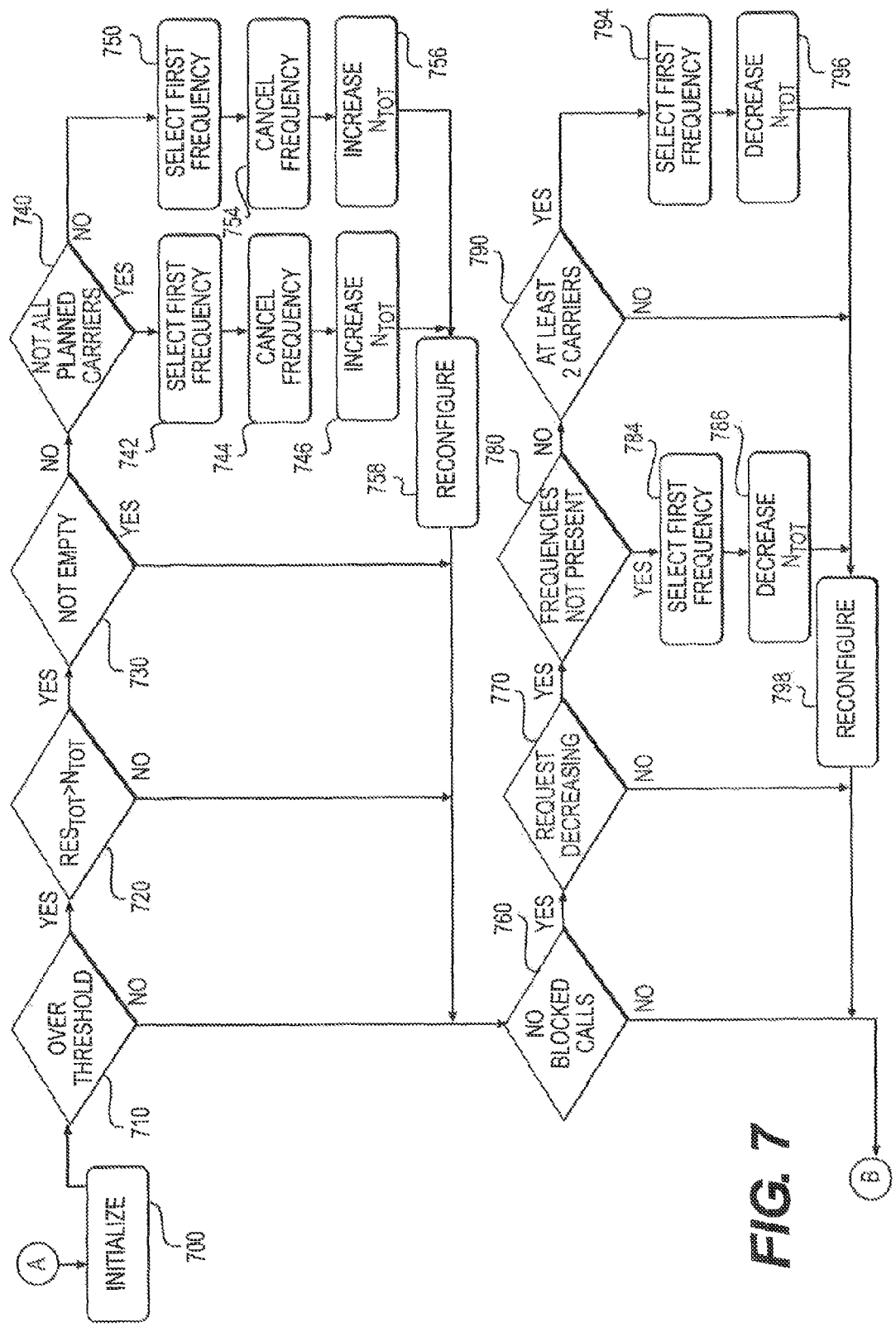
Figure 8:
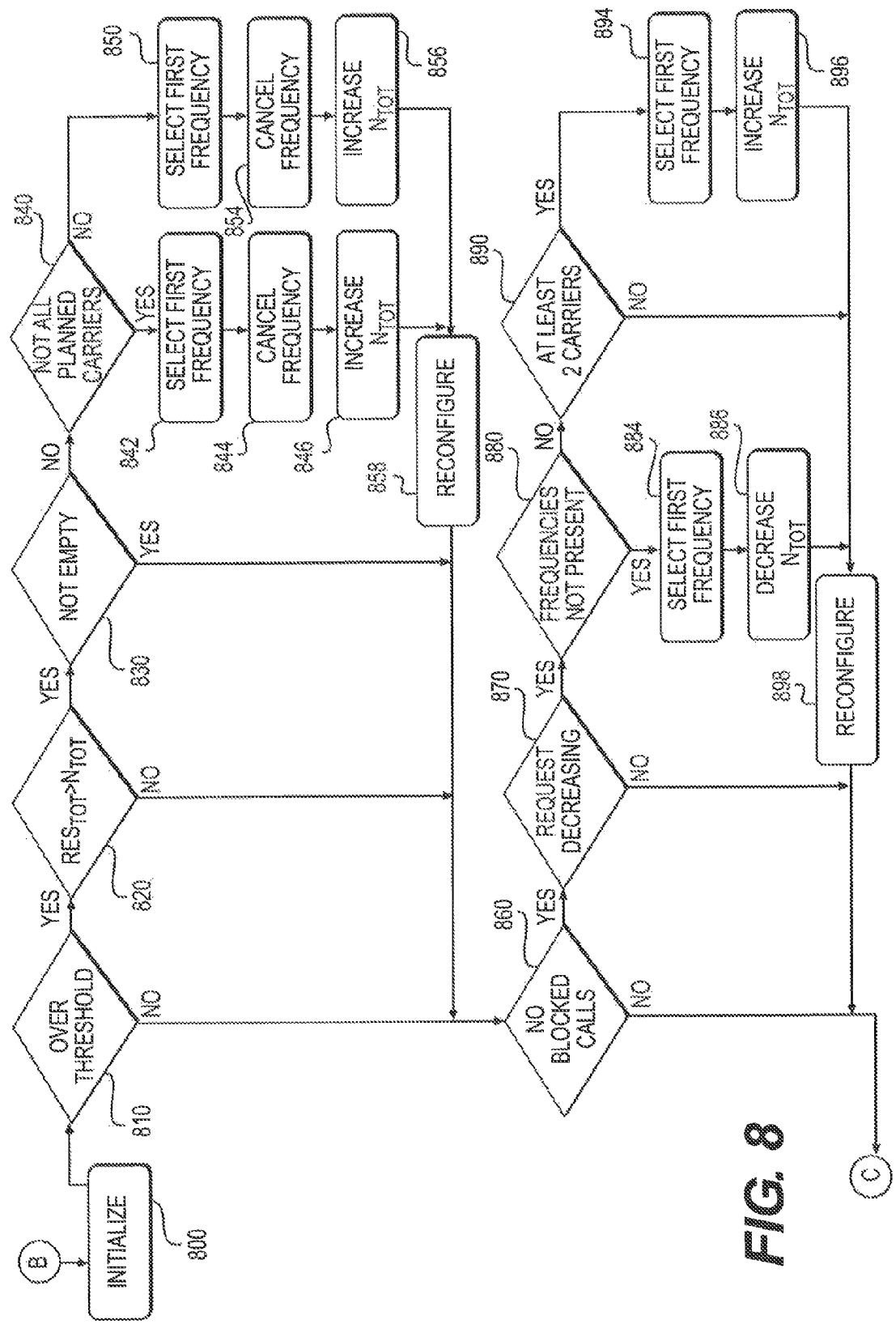

The Configuration Manager 14, taking into account every cell managed by the radio controller 10 depending on the performed ordering, goes on by performing the following steps (FIG. 6, 7, 8):

1. if the number of GSM requests R$_{GSM}$ is greater than 0 (step 600-YES):
   a. estimating new percentage of GSM requests with the following formula (step 605):

$$\alpha = k_{GSM} \cdot \frac{N_{GSM}}{N_{GSM} + N_{UMTS}} + (1 - k_{GSM}) \cdot \frac{R_{GSM}}{R_{GSM} + R_{UMTS}};$$

alternatively (step 600-NO), not performing step 605 and proceeding with step 610;

2. if the number of UMTS requests R$_{UMTS}$ is greater than 0 (step 610-YES):
   b. estimating the new percentage of UMTS requests with the following formula (step 615):

$$\beta = k_{UMTS} \cdot \frac{N_{UMTS}}{N_{GSM} + N_{UMTS}} + (1 - k_{UMTS}) \cdot \frac{R_{UMTS}}{R_{GSM} + R_{UMTS}};$$

alternatively (step 610-NO), not performing step 615 and proceeding with step 620;

The above-mentioned expressions represent, for each system, a measure, with values ranging between 0 and 1, of resources occupation and resources request.

Greater request forecasts for each system, parametrized to global occupation and request for used systems, correspond to higher measure values.

Obviously, such measures can also be determined with expressions of a different type without modifying their meaning.

3. if $\alpha > \alpha_{THRESHOLD}$ or $\beta > \beta_{THRESHOLD}$ (namely if $\alpha$ is not null or $\beta$ is not null) (step 620-YES):
respectively proceeding to step A and B with cell status check for the systems in use.
c. Initialising to FALSE the local variable reconfig$_{UMTS}$ (step 800).

GSM Cell Status Check c1. Initialising to FALSE the local variable reconfig$_{GSM}$ (step 700)
d. if Blocked$_{GSM}$>BlockedThreshold$_{GSM}$ (namely if the percentage of blocked calls exceeds the threshold) (step 710-YES)
   i. and if RES$_{tot}$>N$_{tot}$ (namely if the cell hardware is not configured by using all available resources) (step 720-YES):
   (1) and if AvailableFreq$_{GSM}$ is not empty (step 730-NO):
      1. and if active cell GSM carriers being present in ActiveFreq$_{GSM}$ are not all the planned carriers being present in PlannedFreq$_{GSM}$ (step 740-NO):
         (a) selecting the first frequency being present in AvailableFreq$_{GSM}$ that is also present in PlannedFreq$_{GSM}$ and is not present in ActiveFreq$_{GSM}$ and storing it in variable AddCarrier$_{GSM}$ (step 750);
         (b) cancelling such frequency AddCarrier$_{GSM}$ from AvailableFreq$_{GSM}$ lists of current cell and adjacent cells (step 754);
         (c) increasing N$_{tot}$ value proportionally to the new amount of available resources with the new carrier (step 756);
         (d) placing reconfig$_{GSM}$ equal to TRUE (namely the Configuration Manager 14 decides to reconfigure the cell for the GSM system) (step 758);
      2. otherwise, if the active cell GSM carriers being present in ActiveFreq$_{GSM}$ are all the planned carriers being present in PlannedFreq$_{GSM}$ (step 740-YES):
         (e) selecting the first frequency being present in the list of available frequencies AvailableFreq$_{GSM}$ and not present in ActiveFreq$_{GSM}$ and storing it in variable AddCarrier$_{GSM}$ (step 742);
         (f) cancelling such frequency AddCarrier$_{GSM}$ from AvailableFreq$_{GSM}$ lists of current cell and adjacent cells (step 744);
         (g) increasing N$_{tot}$ value proportionally to the new amount of available resources with the new carrier (step 746);
         (h) placing reconfig$_{GSM}$ equal to TRUE (namely the Configuration Manager 14 decides to reconfigure the cell for the GSM system and goes to step 758);
   (1bis). Otherwise (step 730-YES) proceeding to step 760
   i.bis. Otherwise (step 720-NO) proceeding to step 760
e. if Blocked$_{GSM}$=0 (namely if the percentage of blocked GSM calls is null) (step 760-YES);

ii. and if oldR$_{GSM}$>R$_{GSM}$ (namely if the number of GSM requests is decreasing in the last two periods T) (step 770-YES):
   (2). and if among active cell GSM carriers being present in ActiveFreq$_{GSM}$ there are frequencies that are not present in PlannedFreq$_{GSM}$ (step 780-YES);
      3. selecting the first frequency being present in the list of available frequencies ActiveFreq$_{GSM}$ and that is not present in PlannedFreq$_{GSM}$ and storing it in variable DropCarrier$_{GSM}$ (step 784);
      4. decreasing N$_{tot}$ value proportionally to the new amount of resources lost by removing one carrier (step 786);
      5. placing reconfig$_{GSM}$ equal to TRUE (namely the Configuration Manager 14 decides to reconfigure the cell for the GSM system) (step 798);
   (3). otherwise (step 780-NO), if ActiveFreq$_{GSM}$ contains at least 2 carriers (step 790-YES):
      6. selecting the first frequency being present in the list of available frequencies ActiveFreq$_{GSM}$ and storing it in variable DropCarrier$_{GSM}$ (step 794);
      7. decreasing N$_{tot}$ value proportionally to the new amount of resources lost by removing one carrier (step 796);
      8. placing reconfig$_{GSM}$ equal to TRUE (namely the Configuration Manager 14 decides to reconfigure the cell for the GSM system and goes to step 798)
   (4) otherwise (step 790-NO)
      9. placing reconfig$_{GSM}$ equal to TRUE (namely the Configuration Manager 14 decides to reconfigure the cell for the GSM system and goes to step 798).
   ii.bis. Otherwise (step 770-NO) proceeding to step 800
e.bis. Otherwise (step 760-NO) proceeding to step 800

UMTS Cell Status Check c2. Initialising to FALSE the local variable reconfig$_{UMTS}$ (step 800);
f. if Blocked$_{UMTS}$>BlockedThreshold$_{UMTS}$ (namely if the percentage of blocked calls exceeds the threshold) (step 810-YES)
   iii. and if RES$_{tot}$>N$_{tot}$ (namely if the cell hardware is not configured by using all available resources) (step 820-YES):
   (5). and if AvailableFreq$_{UMTS}$ is not empty (step 830-NO)
      10. and if active cell UMTS carriers being present in ActiveFreq$_{UMTS}$ are not all the planned carriers being present in PlannedFreq$_{UMTS}$ (step 840-NO)
         (i) selecting the first frequency being present in AvailableFreq$_{UMTS}$ that is also present in PlannedFreq$_{UMTS}$ and is not present in ActiveFreq$_{UMTS}$ and storing it in variable AddCarrier$_{UMTS}$ (step 850);
         (j) cancelling such frequency AddCarrier$_{UMTS}$ from AvailableFreq$_{UMTS}$ lists of current cell and adjacent cells (step 854);
         (k) increasing N$_{tot}$ value proportionally to the new amount of available resources with the new carrier (step 856);
         (l) placing reconfig$_{UMTS}$ equal to TRUE (namely the Configuration Manager 14 decides to reconfigure the cell for the UMTS system) (step 858);

11. otherwise (step 840-YES), if active cell UMTS carriers being present in ActiveFreq$_{UMTS}$ are all the planned carriers being present in PlannedFreq$_{UMTS}$ (m) selecting the first frequency being present in the list of available frequencies AvailableFreq$_{UMTS}$ and not present in ActiveFreq$_{UMTS}$ and storing it in variable AddCarrier$_{UMTS}$ (step 842);

(n) cancelling such frequency AddCarrier$_{UMTS}$ from AvailableFreq$_{UMTS}$ lists of current cell and adjacent cells (step 844);

(o) increasing N$_{tot}$ value proportionally to the new amount of available resources with the new carrier (step 846);

(p) placing reconfig$_{UMTS}$ equal to TRUE (namely the Configuration Manager 14 decides to reconfigure the cell for the UMTS system and goes to step 858);

(5bis). Otherwise (step 830-YES) proceeding to step 860 iiibis. Otherwise (step 820-NO) proceeding to step 860 g. if Blocked$_{UMTS}$=0 (namely if the percentage of blocked UMTS calls is null) (step 860-YES)

iv. and if oldR$_{UMTS}$>R$_{UMTS}$ (namely if the number of UTMS requests is decreasing in the last two periods T) (step 870-YES):

(6). and if among the active cell UMTS carriers being present in ActiveFreq$_{UMTS}$ there are frequencies that are not present in PlannedFreq$_{UMTS}$ (step 880-YES);

12. selecting the first frequency being present in the list of available frequencies ActiveFreq$_{UMTS}$ and not present in PlannedFreq$_{UMTS}$ and storing it in variable DropCarrier$_{UMTS}$ (step 884);

13. decreasing N$_{tot}$ value proportionally to the new amount of resources lost by removing one carrier (step 886);

14. placing reconfig$_{UMTS}$ equal to TRUE (namely the Configuration Manager 14 decides to reconfigure the cell for the UMTS system);

(7). otherwise (step 880-NO), if ActiveFreq$_{UMTS}$ contains at least 2 carriers (step 890-YES):

15. selecting the first frequency being present in the list of available frequencies ActiveFreq$_{UMTS}$ and storing it in variable DropCarrier$_{UMTS}$ (step 894);

16. decreasing N$_{tot}$ value proportionally to the new amount of resources lost by removing one carrier (step 896);

17. placing reconfig$_{UMTS}$ equal to TRUE (namely the Configuration Manager 14 decides to reconfigure the cell for the UMTS system and goes to step 898);

(8). otherwise (step 890-NO)

18. placing reconfig$_{UMTS}$ equal to TRUE (namely the Configuration Manager 14 decides to reconfigure the cell for the UMTS system and goes to step 898);

iv.bis. Otherwise (step 870-NO) proceeding to step 630 g.bis. Otherwise (step 860-NO) proceeding to step 630

Dynamic Cells Configuration 4. if reconfig$_{GSM}$ equal to TRUE or reconfig$_{UMTS}$ equal to TRUE (namely if the Configuration Manager 14 decided to reconfigure the cell for the GSM system or for the UMTS system) (step 630-YES):

h. and if α>=β and reconfig$_{GSM}$ equal to TRUE (step 640-YES)

i. placing A$_{GSM}$=αN$_{tot}$ and placing A$_{UMTS}$=(1−α)N$_{tot}$; (assigning the majority of resources to GSM if alpha is greater than or equal to beta) (step 645)

ii. the Configuration Manager 14 sends to the base station that manages the cell the CELL RECONFIGURATION COMMAND reconfiguration message (step 658) with the following fields:
Cell identifier;
Number of GSM resources to be configured: A$_{GSM}$;
Number of UMTS resources to be configured: A$_{UMTS}$;
List of GSM carriers to be configured in the cell: ActiveFreq$_{GSM}$ to which AddCarrier$_{GSM}$ (if present) is added and DropCarrier$_{GSM}$ (if present) is removed;
List of UMTS carriers to be configured in the cell: ActiveFreq$_{UMTS}$ to which AddCarrier$_{UMTS}$ (if present) is added and DropCarrier$_{UMTS}$ (if present) is removed;

i. otherwise (step 640-NO), if reconfig$_{UMTS}$ equal to TRUE (step 650-YES):

i. placing A$_{UMTS}$=βN$_{tot}$ and placing A$_{GSM}$=(1−β)N$_{tot}$ (namely assigning the majority of resources to UMTS if beta is greater than alpha) (step 655);

ii. the Configuration Manager 14 sends to the base station that manages the cell the CELL RECONFIGURATION COMMAND reconfiguration message (step 658) with the following fields:
Cell identifier;
Number of GSM resources to be configured: A$_{GSM}$;
Number of UMTS resources to be configured: A$_{UMTS}$;
List of GSM carriers to be configured in the cell: ActiveFreq$_{GSM}$ to which AddCarrier$_{GSM}$ (if present) is added and DropCarrier$_{GSM}$ (if present) is removed;
List of UMTS carriers to be configured in the cell: ActiveFreq$_{UMTS}$ to which AddCarrier$_{UMTS}$ (if present) is added and DropCarrier$_{UMTS}$ (if present) is removed;

j. otherwise (step 650-NO) go to step 660

6. oldR$_{GSM}$=R$_{GSM}$; oldR$_{UMTS}$=R$_{UMTS}$; (step 660)
7. emptying List$_{GSM}$ list, emptying List$_{UMTS}$ list; (step 665)
8. resetting R$_{GSM}$ counter, resetting R$_{UMTS}$ counter; (step 670)
9. resetting REQ$_{GSM}$ counter, resetting REJ$_{GSM}$ counter; (step 675)
10. resetting REQ$_{UMTS}$ counter; resetting REJ$_{UMTS}$ counter. (step 680)

Figure 9:
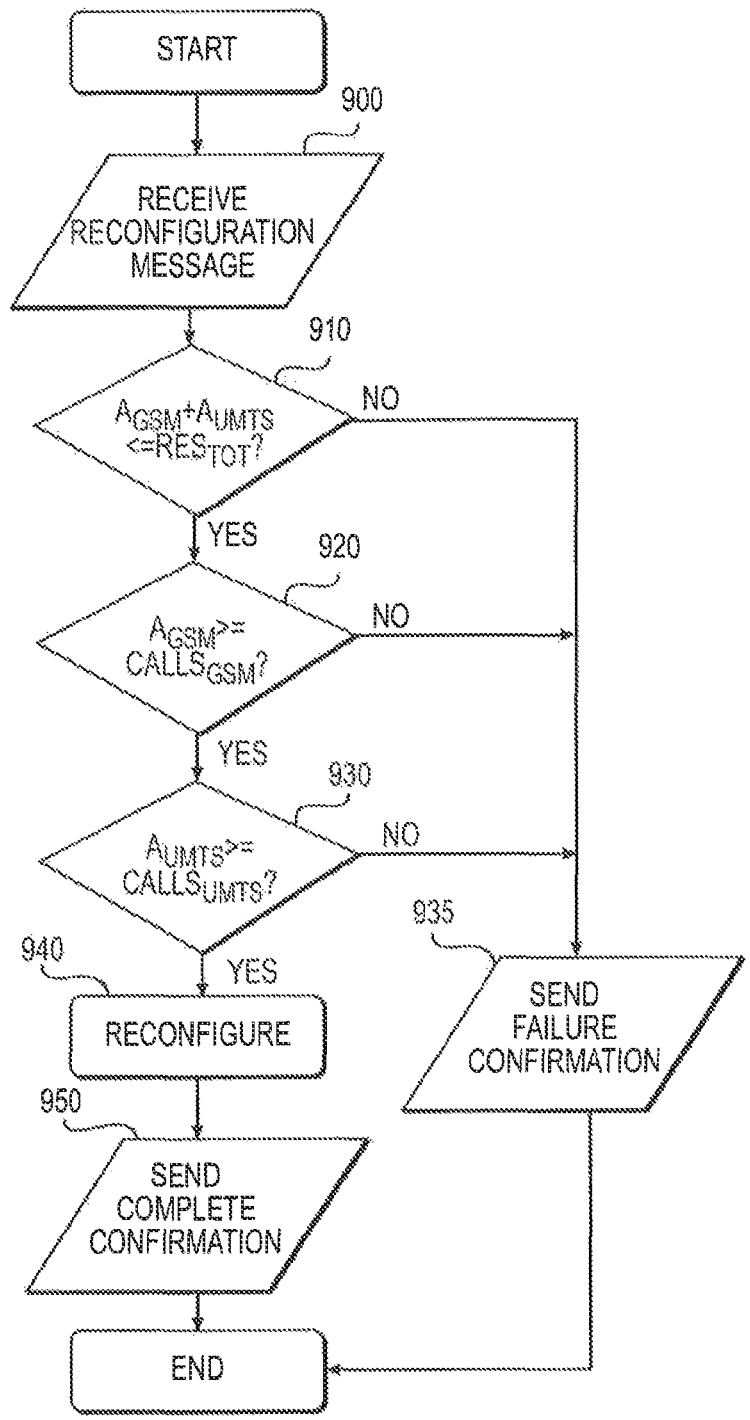
FIG. 9 shows the procedure performed by the base radio station upon receiving a reconfiguration message.

The base station, upon receiving the CELL RECONFIGURATION COMMAND reconfiguration message (step 900, FIG. 9), performs, for example, the following procedure:

1. if the required configuration is compatible with cell resources (namely the number of total resources RES$_{tot}$ is greater than or equal to the sum A$_{GSM}$+A$_{UMTS}$) (step 910-YES):

a. and if the number of required GSM resources A$_{GSM}$ is not less than the current number of active GSM calls Calls$_{GSM}$ (step 920-YES):

i. and if the number of required UMTS resources A$_{UMTS}$ is not less than the current number of active UMTS calls Calls$_{UMTS}$ (step 930-YES):

(1) Performing the reconfiguration (step 940);
(2) Sending the radio controller the CELL RECONFIGURATION COMPLETE confirmation message (step 950) with the following fields:
Cell identifier.

ii. otherwise (step 930-NO):

(3). Sending the radio controller the CELL RECONFIGURATION FAILURE confirmation message (step 935) with the following fields:
Cell identifier
b. otherwise (step 920-NO):
iii. going to step 935 and sending the radio controller the CELL RECONFIGURATION FAILURE confirmation message
2. otherwise (step 910-NO):
b. going to step 935 and sending radio controller the CELL RECONFIGURATION FAILURE confirmation message Upon receiving the CELL RECONFIGURATION COMPLETE reconfiguration message, the radio controller performs, for example, the following procedure:
1. updating the configuration of available resources for GSM by setting $N_{GSM}=A_{GSM}$;
2. updating the configuration of available resources for UMTS by setting $N_{UMTS}=A_{UMTS}$;
3. if $AddCarrier_{GSM}$ is present:
    a. adding the $AddCarrier_{GSM}$ frequency in $ActiveFreq_{GSM}$;
4. if $DropCarrier_{GSM}$ is present:
    a. cancelling the $DropCarrier_{GSM}$ frequency from $ActiveFreq_{GSM}$;
    b. adding such $DropCarrier_{GSM}$ frequency in $AvailableFreq_{GSM}$ of this cell and adjacent cells.
5. if $AddCarrier_{UMTS}$ is present:
    a. adding the $AddCarrier_{UMTS}$ frequency in $ActiveFreq_{UMTS}$.
6. if $DropCarrier_{UMTS}$ is present:
    a. cancelling the $DropCarrier_{UMTS}$ frequency in $ActiveFreq_{UMTS}$;
    b. adding such $DropCarrier_{UMTS}$ frequency in $AvailableFreq_{UMTS}$ of this cell and adjacent cells.
7. resetting $A_{GSM}$;
8. resetting $A_{UMTS}$;
9. resetting $AddCarrier_{GSM}$;
10. resetting $DropCarrier_{GSM}$;
11. resetting $AddCarrier_{UMTS}$;
12. resetting $DropCarrier_{UMTS}$.

Upon receiving the CELL RECONFIGURATION FAILURE reconfiguration message, the radio controller performs the following procedure:
1. resetting $A_{GSM}$;
2. resetting $A_{UMTS}$;
3. if $AddCarrier_{GSM}$ is present:
    a. decreasing $N_{tot}$ value proportionally to the new amount of resources that have not been added due to the failure;
    b. adding such $AddCarrier_{GSM}$ frequency to $AvailableFreq_{GSM}$ lists of this cell and adjacent cells.
4. if $AddCarrier_{UMTS}$ is present:
    a. decreasing $N_{tot}$ value proportionally to the new amount of resources that have not been added due to the failure.
    b. adding such $AddCarrier_{UMTS}$ to $AvailableFreq_{UMTS}$ lists of this cell and adjacent cells.
5. if $DropCarrier_{GSM}$ is present:
    a. increasing $N_{tot}$ value proportionally to the new amount of resources that have not been removed due to the failure.
6. if $DropCarrier_{UMTS}$ is present:
    a. increasing $N_{tot}$ value proportionally to the new amount of resources that have not been removed due to the failure.
7. resetting $AddCarrier_{GSM}$;
8. resetting $DropCarrier_{GSM}$;
9. resetting $AddCarrier_{UMTS}$;
10. resetting $DropCarrier_{UMTS}$.

As pointed out in the example, the method for reconfiguring a cellular network as described allows reconfiguring the cells managed by a plurality of base stations by transferring, within the network managed by a radio controller, radio resources:
within a cell, for example in case of many systems; and/or
from less loaded cells to more loaded cells, in case of one or more systems.

The cells, according to the present embodiment, are reconfigured independently from the base station that manages the cells, thereby allowing to optimise the cellular network behaviour in an area covered by a plurality of base stations.

In the embodiment of the invention described as an example, the managed cellular radio-mobile systems are GSM/GPRS/EDGE and UMTS.

As a person skilled in the art can observe, the invention can also be applied to other cellular and wireless systems, such as, for example, CDMA One, CDMA 2000, WLAN (802.11x), 802.16, DVB-T, DVB-S, DVB-H, that comprise re-configurable base radio stations.

In the example, reference has been made to re-configurable base stations that are able to manage two radio systems and the method has been described in detail for such type of example.

In alternative embodiments, the method can also be applied in cellular networks comprising re-configurable base stations that are able to manage a single type of system.

Alternatively, as a person skilled in the art can appreciate, the method can also be applied in cellular networks comprising re-configurable base stations that are able to manage more than two types of system.

According to the invention, the communication protocol for reconfiguration messages between radio controller 10 and base station (BS1, . . . , BSK) provides for the use of protocol messages transmitted on a specific communication channel that is independent from the system being used.

Further embodiments of the invention can provide, for example the use as communication channel of one of the channels being present in the system being used, for example one of the channels provided by the standard for the system being used (for example Abis interface for GSM or Iub interface for UMTS).

In order to implement such embodiment, as will be clear for a person skilled in the art, it is suitable to make the necessary modifications to related interface managing protocols of communication channels between radio controller 10 and base station (BS1, . . . , BSK), for example Base Transceiver Station Management—BTSM for GSM and NodeB Application Part—NBAP for UMTS, by inserting protocol messages, respective fields and related procedures as described.

The description of a preferred embodiment of the invention provides that the initial operating condition of the procedure is based on the frequency planning performed, for example, by the operator.

A possible alternative can provide that the initial operating condition of the procedure is starting with an absent frequency planning, namely in which $PlannedFreq_{GSM}$ and $PlannedFreq_{UMTS}$ quantities are empty; in such case, when the two macro-steps are proceeding, the method according to the invention automatically determines the frequencies to be used in each cell without the need of an operator's intervention to define the frequency planning beforehand.

The description of the preferred embodiment has identified the frequency as radio resource or channel.

As can be easily understood by a person skilled in the art, the identified radio resource can also be, within the cellular network, a CDMA code, a time slot or a combination thereof, and therefore further embodiments can provide for the use of such resources for implementing the method.

The described architecture has been referred to a single radio controller configured for checking and reconfiguring a plurality of cells by means of a plurality or re-configurable base stations.

As a person skilled in the art can easily understand, alternative embodiments can provide an architecture that comprises a plurality of mutually inter-connected radio controllers that are configured for exchanging data and messages and for extensively applying the method according to the invention; for example, by exchanging radio resources or channels among the cells controlled by the different radio controllers.

The invention as described allows dynamically reconfiguring the network cells in order to assign more radio resources to the more loaded cells by taking such resources from less loaded cells.

Alternative embodiments can allow the operator to reconfigure radio apparatus or base stations by converting them from initial configurations associated to obsolete or previously-introduced systems into new configurations associated with new systems, when the amount of network cells traffic changes.

Such further embodiment would be useful for dynamically managing the network transformation from one system to another, by progressively following the traffic evolution towards the newly-introduced system.

It will be appreciated that obvious modifications or variations are possible to the above description, as regards sizes, shapes, materials, components, circuit elements, connections, as well as in construction details and operating method, shown merely as a non-limiting example, without departing from the invention.

The invention claimed is:

1. A method for configuring a wireless telecommunications network adapted to operate according to at least two radio systems, comprising a plurality of base radio stations of a re-configurable type, and a configuration manager associated with at least one set of said base radio stations, wherein each base radio station manages one or more cells of said telecommunications network, each cell has determined radio resources available, and the cells managed by the base radio stations associated with the configuration manager include a first set of cells, the method comprising the steps of:
   a) measuring, using the configuration manager, a cell load status of said first set of cells; and
   b) dynamically configuring, using the configuration manager, a sub-set of cells of said first set of cells by assigning thereto determined available radio resources depending on the measurements performed by the configuration manager comprising:
      calculating, using the configuration manager, a ratio between number of unsatisfied requests and total number of performed requests per system in each one of said first set of cells;
      using the ratios for the at least two systems in each one of said first set of cells to calculate, using the configuration manager, an index associated with a corresponding one of said first set of cells, said index having a value indicative of an overall congestion condition or status for the at least two systems in said corresponding one of said first set of cells;
      ordering, using the configuration manager, said first set of cells according to a priority order determined by said index; and
      reconfiguring, using the configuration manager, said sub-set of cells depending on said priority order.

2. The method according to claim 1, wherein assigning said determined available radio resources comprises:
   transferring, using the configuration manager, said determined radio resources from a first cell of said sub-set of cells to at least one second cell of said sub-set of cells.

3. The method according to claim 1, wherein the step of measuring, using the configuration manager, the load status of said first set of cells comprises the step of:
   measuring in a determined time interval:
      the amount of radio traffic per system for said first set of cells; and
      the amount of available and/or unavailable radio resources per system for said first set of cells.

4. The method according to claim 3, wherein the step of measuring in a determined interval of time said amount of traffic and said amount of radio resources comprises measuring at least one set of data selected from the group of:
   list of radio frequencies assigned and in-use per system to each one of said first set of cells;
   list of codes assigned and in-use per system to each of said first set of cells;
   list of time slots assigned and in-use per system of each one of said first set of cells;
   number of radio frequencies assigned and in-use per system to each one of said first set of cells;
   number of codes assigned and in-use per system to each one of said first set of cells; and
   number of time slots assigned and in-use per system to each one of said first set of cells.

5. The method according to claim 1, wherein the step of dynamically configuring, using the configuration manager, a sub-set of cells of said first set of cells comprises:
   transferring, using the manager, said determined radio resources in at least one cell from a first to at least one second system of said at least two systems.

6. The method according to claim 1, wherein the step of dynamically configuring, using the configuration manager, a sub-set of cells of said first set of cells further comprises:
   exchanging, between the configuration manager and at least one set of said base radio stations, configuration messages comprising:
      at least one configuration command; and
      at least one message selected from the group of:
         completed configuration notification; and
         failed configuration notification.

7. The method according to claim 1, wherein said at least two systems are selected from the group of:
   a system of the GSM type;
   a system of the UMTS type;
   a system of the CdmaOne type;
   a system of the Cdma2000 type;
   a system of the WLAN type;
   a system of the 802.16 (WIMAX) or 802.20 type; and
   a system of the DVB-T, DVD-S, DVB-H or DAB type.

8. A telecommunications network of a wireless type for operating according to at least two radio systems and comprising:
   a plurality of base radio stations of a re-configurable type for managing respective one or more cells of said telecommunications network, each one of said cells having determined radio resources available; and
   a configuration manager associated with at least one set of said plurality of base radio stations, the cells managed by the base radio stations associated with the configuration manager being a first set of cells, and the configuration manager having a memory, for:
      measuring a cell load status of said first set of cells; and dynamically reconfiguring a sub-set of cells of said first set of cells by modifying said determined available radio resources depending on the performed measurements, comprising:
calculating a ratio between number of unsatisfied requests and total number of performed requests per system in each one of said first set of cells;
using the ratios for the at least two systems in each one of said first set of cells to calculate an index having a value indicative of an overall congestion condition or status for the at least two systems in said corresponding one of said first set of cells;
ordering said first set of cells according to a priority order determined by said index; and
reconfiguring said sub-set of cells depending on said priority order.

9. The telecommunications network according to claim 8, wherein said configuration manager transfers said determined radio resources within a cell of said sub-set of cells, and/or from a first cell of said sub-set of cells to at least a second cell of said sub-set of cells.

10. The telecommunications network according to claim 8, wherein said configuration manager determines said load status by measuring in a determined time interval the amount of radio traffic per system for each one of said first set of cells and the amount of available and/or unavailable radio resources per system for each one of said first set of cells.

11. The telecommunications network according to claim 10, wherein said configuration manager comprises modules and memory for measuring and/or storing, as representative of said amount of radio traffic and said amount of radio resources, a set of data selected from the group of:
list of radio frequencies assigned and in-use per system to each one of said first set of cells;
list of codes assigned and in-use per system to each of said first set of cells;
list of time slots assigned and in-use per system to each one of said first set of cells;
number of radio frequencies assigned and in-use per system to each one of said first set of cells;
number of codes assigned and in-use per system to each one of said first set of cells; and
number of time slots assigned and in-use per system to each one of said first set of cells.

12. The telecommunications network according to claim 8, said configuration manager:
exchanging, with at least one set of said base radio stations, reconfiguration messages comprising:
at least one reconfiguration command; and
at least one message selected from the group of:
completed configuration notification; and
failed configuration notification.

13. The telecommunications network according to claim 8 comprising:
an access network comprising at least one control device; and
a core network comprising a plurality of nodes,
wherein said configuration manager resides in said control device.

14. The telecommunications network according to claim 8, comprising a core network comprising a plurality of nodes,
wherein said configuration manager resides in one of said nodes of the core network.

15. The telecommunications network according to claim 14, said configuration manager:
cooperating with a plurality of control devices adapted to control respective sets of base radio stations, and
reconfiguring the cells managed by said respective sets of base radio stations.

16. A control device having a configuration manager for operating a telecommunications network of a cellular type capable of implementing the method as claimed in claim 1.

17. A non-transitory computer-readable medium encoded with a computer program product, loadable into a memory of at least one computer and comprising portions of software code for performing the method according to claim 1.

* * * * *